(12) United States Patent
Hikiri et al.

(10) Patent No.: US 10,655,548 B2
(45) Date of Patent: May 19, 2020

(54) ELECTRIC SUPERCHARGING SYSTEM AND METHOD FOR CONTROLLING ELECTRIC SUPERCHARGER

(71) Applicants: Kunihiko Hikiri, Saitama (JP); Yasuo Asaumi, Saitama (JP); Kenichiro Imaoka, Saitama (JP)

(72) Inventors: Kunihiko Hikiri, Saitama (JP); Yasuo Asaumi, Saitama (JP); Kenichiro Imaoka, Saitama (JP)

(73) Assignee: VOLVO TRUCK CORPORATION, Göteborg (SE)

( * ) Notice: Subject to any disclaimer, the term of this patent is extended or adjusted under 35 U.S.C. 154(b) by 297 days.

(21) Appl. No.: 15/548,780

(22) PCT Filed: Feb. 17, 2015

(86) PCT No.: PCT/JP2015/054320
§ 371 (c)(1),
(2) Date: Oct. 11, 2017

(87) PCT Pub. No.: WO2016/132455
PCT Pub. Date: Aug. 25, 2016

(65) Prior Publication Data
US 2018/0216544 A1 Aug. 2, 2018

(51) Int. Cl.
*F02D 23/02* (2006.01)
*F02D 23/00* (2006.01)
(Continued)

(52) U.S. Cl.
CPC .............. *F02D 23/02* (2013.01); *F02B 33/40* (2013.01); *F02B 37/04* (2013.01); *F02B 37/14* (2013.01);
(Continued)

(58) Field of Classification Search
CPC ...... F02D 23/02; F02D 23/00; F02D 41/0007; F02D 41/045; F02D 41/10;
(Continued)

(56) References Cited

U.S. PATENT DOCUMENTS

| 4,556,038 A | 12/1985 | Okamoto et al. |
| 4,894,991 A * | 1/1990 | Kawamura ......... F02D 41/0007 |
| | | 60/608 |

(Continued)

FOREIGN PATENT DOCUMENTS

| DE | 102006035425 A1 | 6/2007 |
| JP | H11280510 A | 10/1999 |

(Continued)

OTHER PUBLICATIONS

Machine Translation to reference of Hara (Pub. No. JP 2013-107475-A, published on Jun. 6, 2013.*
(Continued)

*Primary Examiner* — Thai Ba Trieu
(74) *Attorney, Agent, or Firm* — Venable LLP; Jeffri A. Kaminski (57) ABSTRACT

An electric supercharging system has an electric supercharger disposed on an intake air passage of an engine and a control unit in which a microcomputer is built. Then, control unit changes an actuation timing of the electric supercharger on the basis of change amounts of a rotational speed and an accelerator opening of the engine. At this time, the control unit changes the actuation timing of the electric supercharger by correcting the actuation timing of the electric supercharger according to the rotational speed of the engine with a coefficient according to the change amount of the accelerator opening.

8 Claims, 8 Drawing Sheets

(51) Int. Cl.
*F02D 41/00* (2006.01)
*F02B 37/04* (2006.01)
*F02B 39/10* (2006.01)
*F02B 37/14* (2006.01)
*F02B 33/40* (2006.01)
*F02D 41/10* (2006.01)
*F02D 41/04* (2006.01)

(52) U.S. Cl.
CPC .............. *F02B 39/10* (2013.01); *F02D 23/00* (2013.01); *F02D 41/0007* (2013.01); *F02D 41/045* (2013.01); *F02D 41/10* (2013.01); F02D 2200/101 (2013.01); F02D 2200/1012 (2013.01); F02D 2200/602 (2013.01); F02D 2200/606 (2013.01); Y02T 10/144 (2013.01)

(58) Field of Classification Search
CPC ....... F02D 2200/101; F02D 2200/1012; F02D 2200/602; F02D 2200/606; F02B 39/10; F02B 33/40; F02B 37/14; Y02T 10/144
USPC .......................................................... 60/608
See application file for complete search history.

(56) References Cited

U.S. PATENT DOCUMENTS

| | | | | |
|---|---|---|---|---|
| 4,981,017 A * | 1/1991 | Hara | ........................ | F02B 39/10 60/608 |
| 6,729,124 B2 * | 5/2004 | Baeuerle | ................. | F02B 37/04 60/280 |
| 6,922,995 B2 * | 8/2005 | Kawamura | .............. | F02B 39/10 60/608 |
| 6,938,420 B2 * | 9/2005 | Kawamura | .............. | F02B 39/10 60/608 |
| 7,451,597 B2 * | 11/2008 | Kojima | .................... | F02B 39/10 60/612 |
| 7,478,533 B2 * | 1/2009 | Ueno | ....................... | F02B 39/10 60/608 |
| 7,762,068 B2 * | 7/2010 | Tabata | ................. | F02D 41/0007 60/608 |
| 7,765,806 B2 * | 8/2010 | Clark | ....................... | F02B 39/10 60/608 |
| 2010/0263638 A1 * | 10/2010 | Kogo | .................. | F02D 41/0007 123/562 |
| 2010/0326407 A1 * | 12/2010 | Igarashi | .................. | F02B 39/10 123/564 |
| 2013/0255251 A1 * | 10/2013 | Tanaka | ..................... | F02B 39/10 60/605.2 |
| 2016/0061102 A1 * | 3/2016 | Sugiyama | ............... | F02B 39/10 60/611 |
| 2016/0061104 A1 * | 3/2016 | Hirayama | ............... | F02B 39/10 60/602 |
| 2016/0076438 A1 * | 3/2016 | Tabata | .................... | F02B 39/10 60/602 |
| 2016/0348578 A1 * | 12/2016 | Oyagi | ...................... | F02B 39/10 |
| 2017/0002726 A1 * | 1/2017 | Iwamoto | ................. | F02B 39/10 |
| 2017/0145906 A1 * | 5/2017 | Tomita | ................ | F02D 41/0007 |
| 2017/0254277 A1 * | 9/2017 | Yoshizawa | ............... | F02B 39/10 |
| 2018/0001984 A1 * | 1/2018 | Yamashita | .............. | F02B 39/10 |
| 2018/0163675 A1 * | 6/2018 | Oshita | ..................... | F02B 39/10 |
| 2018/0361844 A1 * | 12/2018 | Kinzuka | ................. | F02B 39/10 |
| 2019/0003408 A1 * | 1/2019 | Hata | ....................... | F02B 39/10 |
| 2019/0048792 A1 * | 2/2019 | Yamashita | .............. | F02B 39/10 |

FOREIGN PATENT DOCUMENTS

JP        2007132288 A        5/2007
JP        2013108475 A        6/2013

OTHER PUBLICATIONS

European Official Action (dated Jul. 2, 2018) for corresponding European App. EP 15 882 559.6.
International Search Report (dated May 19, 2015) for corresponding International App. PCT/JP2015/054320.
European Office Action dated Oct. 22, 2019 in corresponding EP Application No. 15882559.6, 4 pages.

* cited by examiner

FIG. 11 ional Application No. PCT/JP2015/054320, filed Feb. 17, 2015, the entire contents of which are incorporated by reference herein.

ELECTRIC SUPERCHARGING SYSTEM AND METHOD FOR CONTROLLING ELECTRIC SUPERCHARGER

CROSS-REFERENCE TO RELATED APPLICATIONS

This application claims the benefit under 35 U.S.C. § 365 of International Application No. PCT/JP2015/054320, filed Feb. 17, 2015, the entire contents of which are incorporated by reference herein.

BACKGROUND AND SUMMARY

The present invention relates to an electric supercharging system and a method for controlling electric supercharger.

In the electric supercharging system, whether it is in a supercharge region has been determined on the basis of an engine rotational speed and an accelerator opening and an electric supercharger has been controlled in accordance with a result of determination as described in Japanese Patent Application Laid-open Publication No. 2007-71137 (Patent Document 1).

Patent Document 1: Japanese Patent Application Laid-open Publication No. 2007-71137

However, in a case where whether it is in the supercharge region was determined on the basis of the engine rotational speed and the accelerator opening, an acceleration state in which the accelerator opening is rapidly increased is not taken into consideration and therefore there was a possibility that a delay would occur in actuation of the electric supercharger. When the delay occurs in actuation of the electric supercharger, torque is not increased in conjunction with a change in accelerator opening and, for example, drivability is lowered.

Therefore, it is desirable to provide an electric supercharging system and a method for controlling electric supercharger suppressing the actuation delay of the electric supercharger at an acceleration time.

An electric supercharging system according to an aspect of the present invention has an electric supercharger which is disposed on an intake air passage of an engine and a control unit. Then, the control unit changes an actuation timing of the electric supercharger on the basis of change amounts of the rotational speed and the accelerator opening of the engine.

In addition, in a method for controlling electric supercharger according to an aspect of the present invention, the control unit which controls the electric supercharger which is disposed on the intake air passage of the engine changes the actuation timing of the electric supercharger on the basis of the change amounts of the rotational speed and the accelerator opening of the engine.

According to an aspect of the present invention, the actuation delay of the electric supercharger at the acceleration time can be suppressed.

DETAILED DESCRIPTION

Figure 1:
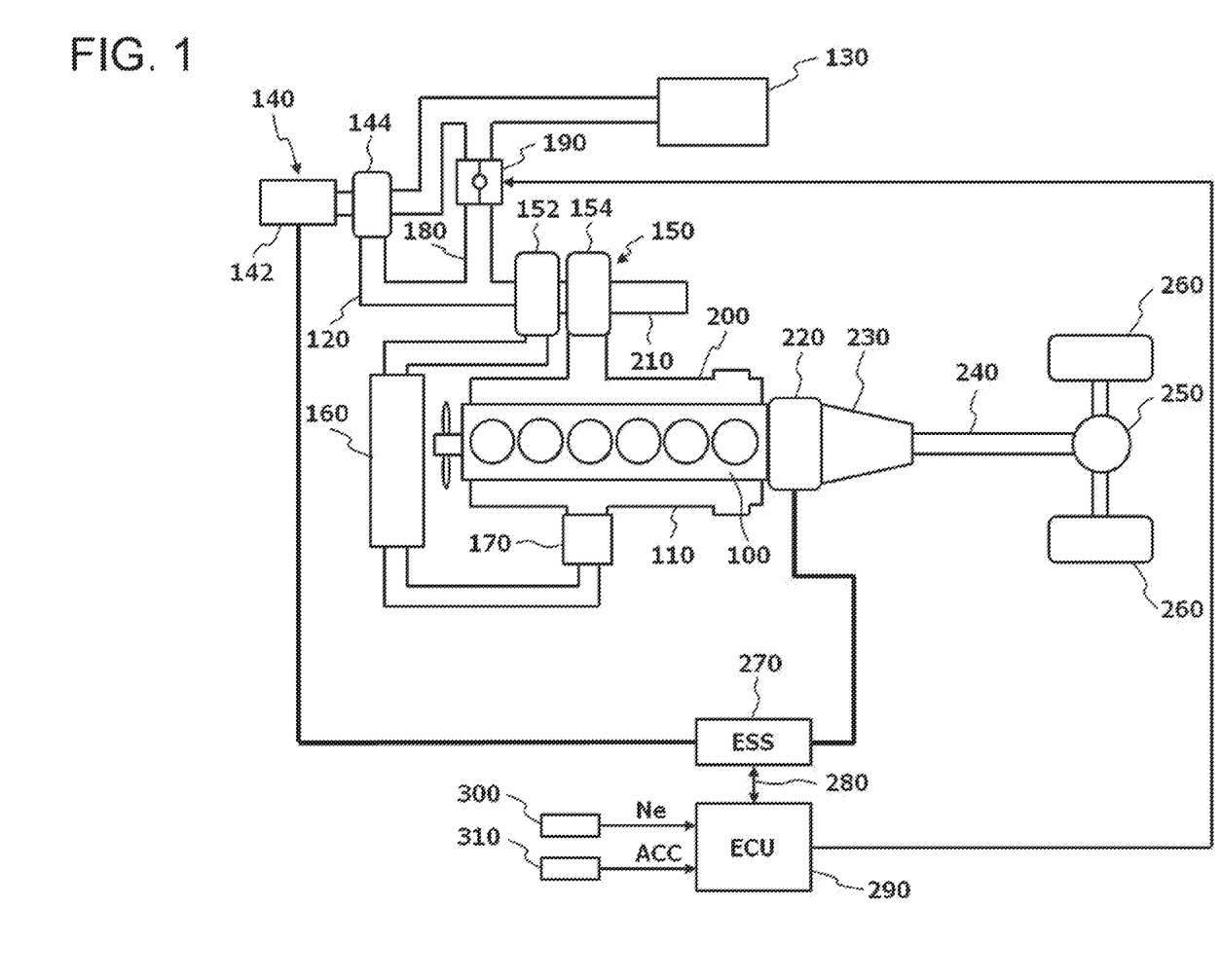
FIG. 1 is an outline diagram illustrating one example of an electric supercharging system.

In the following, an embodiment for carrying out the present invention will be described in detail with reference to the appended drawings. FIG. 1 illustrates one example of an electric supercharging system mounted on a vehicle such as a truck and so forth.

An air cleaner 130, an electric supercharger 140, a compressor 152 of a turbocharger 150, an intercooler 160 and an intake throttle 170 are disposed in this order in an intake pipe 120 which is connected to an intake manifold 110 of a diesel engine 100 along an intake air flowing direction. Incidentally, the engine may be a gasoline engine not limited to the diesel engine 100. Here, the intake pipe 120 is given as one example of an intake air passage.

The air cleaner 130 filters and removes dust and so forth in intake air by an air element. The electric supercharger 140 rotationally drives a compressor 144 by an electric motor 142 such as, for example, a blushless motor and so forth and supercharges the intake air from which the dust and so forth have been removed by the air cleaner 130. The turbocharger 150 supercharges the intake air by the compressor 152 which is rotationally driven with exhaust energy. The intercooler 160 cools the intake air which has passed through the compressor 152 by using, for example, a traveling wind, cooling water. The intake throttle 170 suppresses a vibration which would generate when stopping the diesel engine 100 by, for example, choking the intake air when stopping the diesel engine 100.

The intake pipe 120 of the diesel engine 100 is additionally equipped with a bypass passage 180 which bypasses the compressor 144 of the electric supercharger 140. A remote-controllable channel switching valve 190 which at least fully opens and fully closes the intake air passage is disposed in the bypass passage 180. Here, as the channel switching valve 190, for example, a butterfly valve and so forth whose valve element is rotated by a servomotor and so forth may be used.

Accordingly, when the opening of the channel switching valve 190 is fully opened, the total amount of the intake air which has passed through the air cleaner 130 is not introduced into the compressor 144 of the electric supercharger 140 but is directly introduced into the compressor 152 of the turbocharger 150. On the other hand, when the opening of the channel switching valve 190 is fully closed, the total amount of the intake air which has passed through the air cleaner 130 is introduced into the compressor 152 of the turbocharger 150 via the compressor 144 of the electric supercharger 140. Here, when the channel switching valve 190 is brought to have an intermediate opening between full-open and full-close, the intake air which has passed through the air cleaner 130 is branched into the compressor 144 of the electric supercharger 140 and the compressor 152 of the turbocharger 150 in accordance with the opening of the channel switching valve 190.

A turbine 154 of the turbocharger 150 and an exhaust purification device (not illustrated) are disposed in an exhaust pipe 210 which is connected to an exhaust manifold 200 of the diesel engine 100 along an exhaust air flowing direction. The turbine 154 of the turbocharger 150 is rotationally driven with exhaust air which flows through the exhaust pipe 210 and rotationally drives the compressor 152 which is coupled thereto via a not illustrated shaft. The exhaust purification device selectively purifies a nitrogen oxide in the exhaust air by using, for example, an aqueous solution of urea as a reducing agent precursor.

For example, a constant-mesh transmission 230 is attached to an output shaft of the diesel engine 100 via a clutch or a torque converter (not illustrated) and a motor generator 220. An output shaft of the transmission 230 is coupled to one pair of left and right rear wheels 260 as drive wheels via a propeller shaft 240 and a differential carrier 250. Incidentally, the motor generator 220 may be attached also in parallel with, for example, the transmission 230.

In addition, an energy storage system (ESS) 270 which supplies drive power to the electric motor 142 of the electric supercharger 140 and the motor generator 220 and stores electric power generated by the electric motor 142 and the motor generator 220 is mounted on a predetermined place of the vehicle. The energy storage system 270 is connected to be communicable with an electronic control unit 290 in which a microcomputer is built via an on-vehicle network 280 such as, for example, CAN (Controller Area Network) and so forth. Here, the electronic control unit 290 is given as one example of the control unit.

Figure 2:
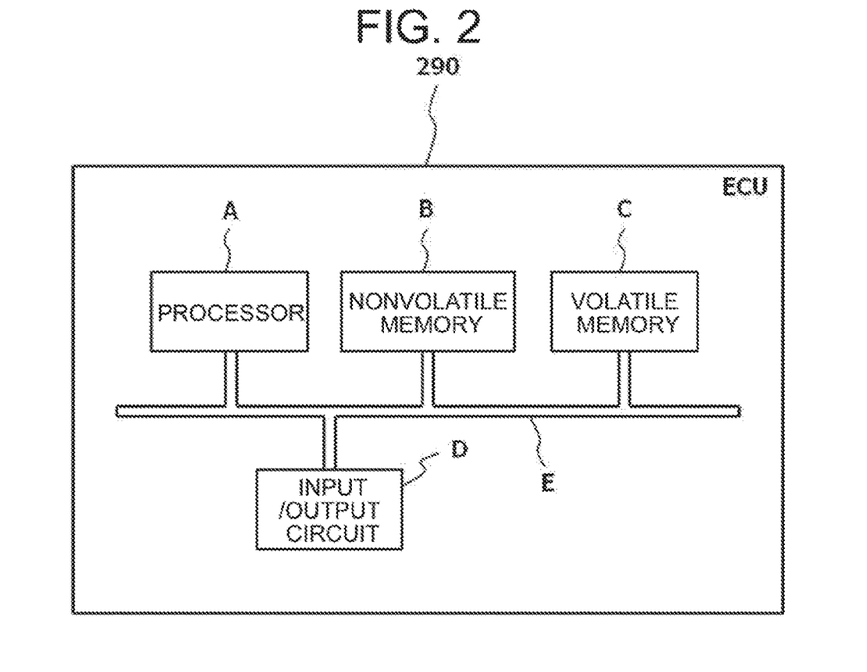
FIG. 2 is a functional block diagram illustrating one example of an electronic control unit.

The electronic control unit 290 has a processor A such as a CPU (Central Processing Unit) and so forth, a nonvolatile memory B such as a flash ROM (Read Only Memory) and so forth, a volatile memory C such as a RAM (Random Access Memory) and so forth, an input/output circuit D which serves as an interface with outer equipment, and a bus E which communicably connects them together as illustrated in FIG. 2.

Respective output signals from a rotational speed sensor 300 which detects a rotational speed Ne of the diesel engine 100 and from an accelerator opening sensor 310 which detects an opening (an accelerator opening) ACC of a not illustrated accelerator pedal are input into the electronic control unit 290. Incidentally, the rotational speed Ne and the accelerator opening ACC may be also read out of, for example, an electronic control unit (not illustrated) of the diesel engine 100 which is connected via the on-vehicle network 280.

The electronic control unit 290 outputs control signals respectively to the channel switching valve 190 and the energy storage system 270 on the basis of the respective output signals from the rotational speed sensor 300 and the accelerator opening sensor 310 and electronically controls actuation and stop of the electric supercharger 140.

Figure 3:
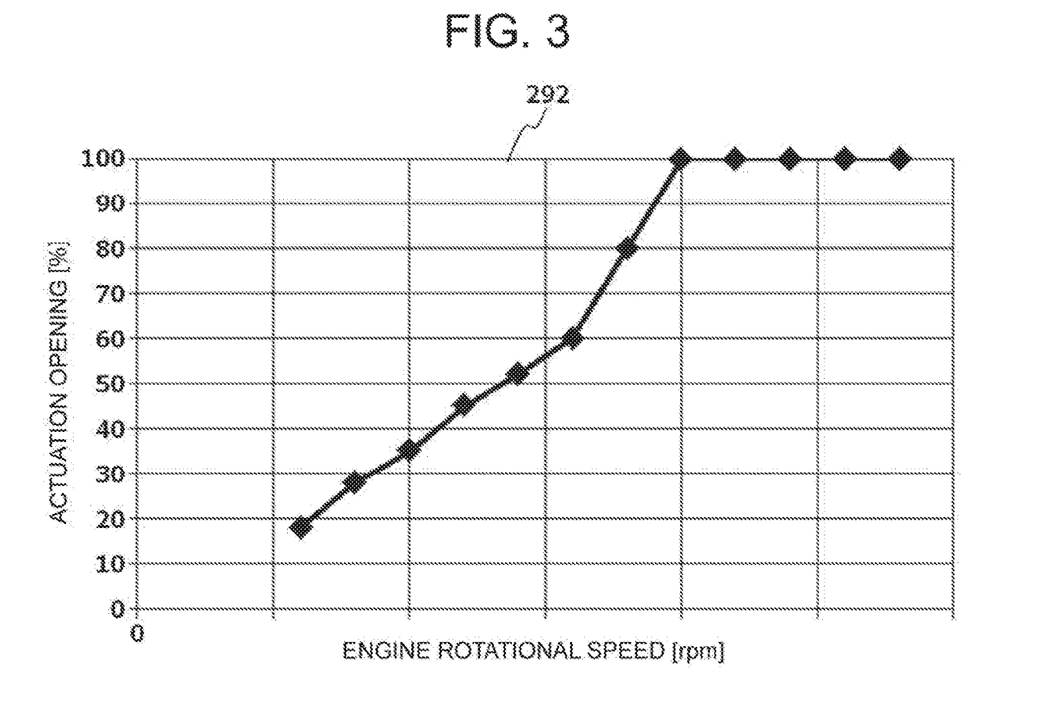
FIG. 3 is an explanatory diagram illustrating one example of an actuation opening map.
Figure 4:
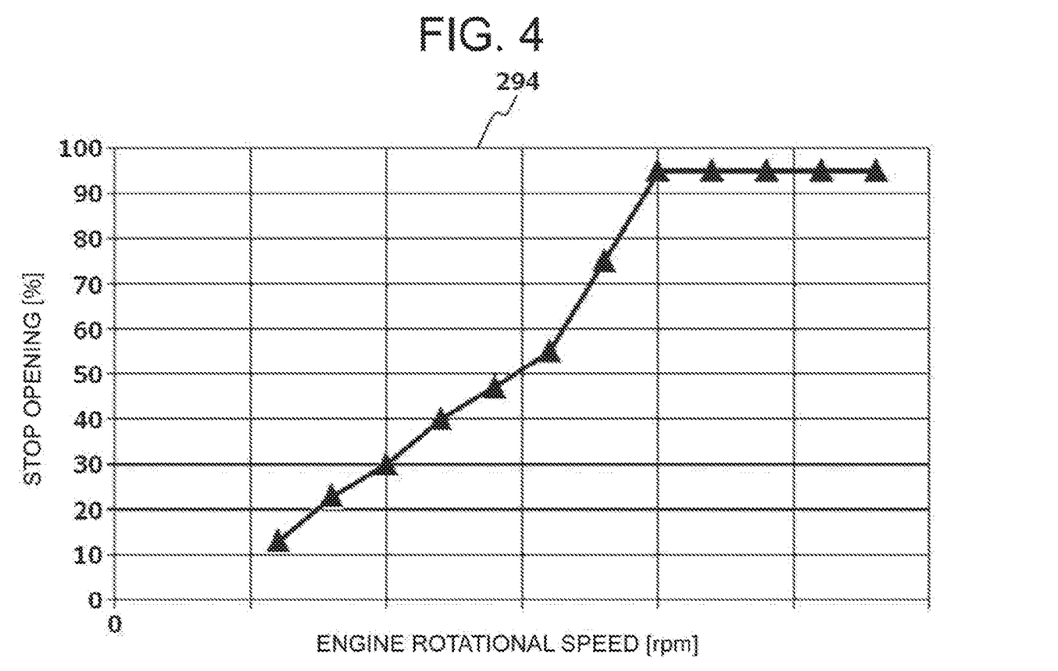
FIG. 4 is an explanatory diagram illustrating one example of a stop opening map.
Figure 5:
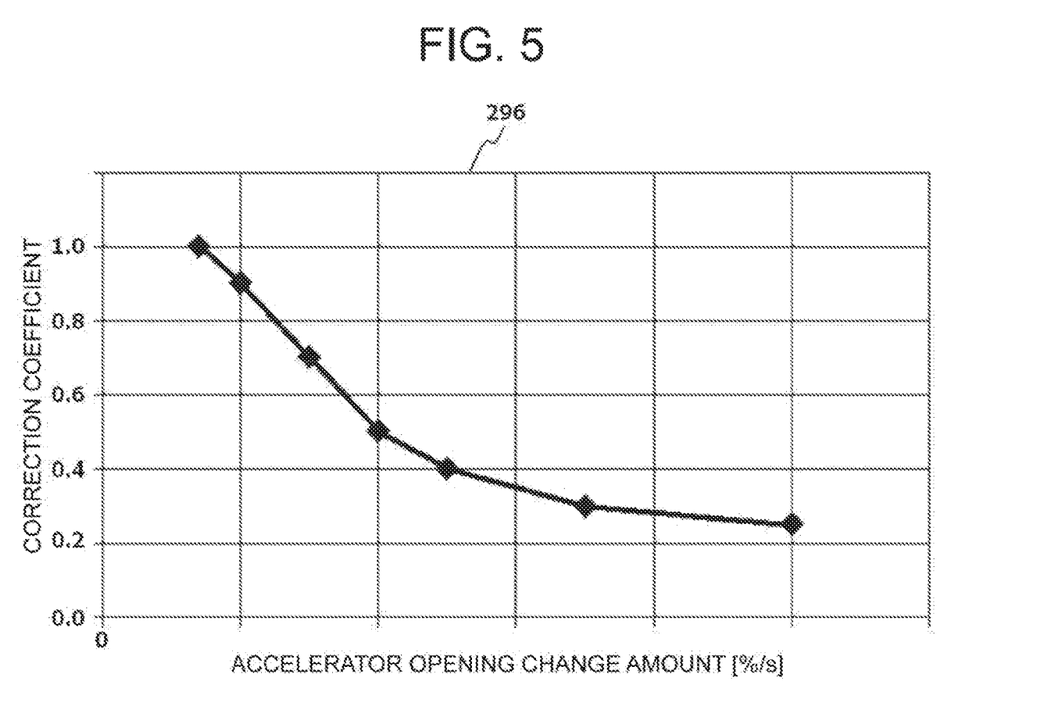
FIG. 5 is an explanatory diagram illustrating one example of a correction coefficient map.

An actuation opening map 292 illustrated in FIG. 3, a stop opening map 294 illustrated in FIG. 4 and a correction coefficient map 296 illustrated in FIG. 5 are respectively stored in the nonvolatile memory B of the electronic control unit 290.

Figure 6:
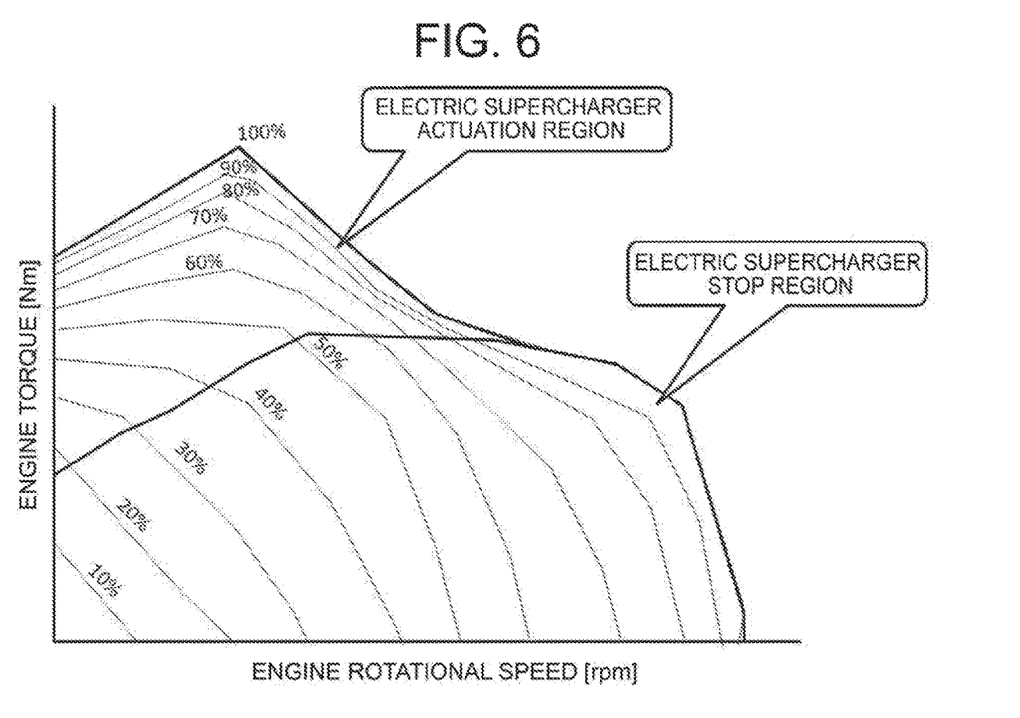
FIG. 6 is an explanatory diagram illustrating one example of an engine characteristic map.

The actuation opening map 292 is a map for defining a timing at which the electric supercharger 140 is actuated at a steady-state operation time and an actuation opening (an accelerator opening) according to the engine rotational speed is set therein as illustrated in FIG. 3. In the illustrated actuation opening map 292, the actuation opening is increased little by little (gradually increased) as the engine rotational speed is increased and the actuation opening becomes 100% (full-open) after reaching a certain engine rotational speed. Accordingly, it can be grasped from this actuation opening map 292 that when the engine rotational speed is low, the actuation timing is advanced and when the engine rotational speed is high, the actuation timing is delayed. Incidentally, the actuation opening map 292 is obtained from an engine characteristic map illustrated in FIG. 6, that is, the map in which an actuation region and a stop region of the electric supercharger 140 is demarcated in a full-load region of the diesel engine 100 by taking the accelerator opening into consideration.

The stop opening map 294 is a map for defining a timing at which the electric supercharger 140 is stopped. As illustrated in FIG. 4, a stop opening (the accelerator opening) according to the engine rotational speed is set in the stop opening map 294. The stop opening map 294 is, for example, a map that predetermined hysteresis (−5%) is given to the actuation opening map 292 in order to suppress hunching and so forth. Accordingly, the stop opening map 294 has a characteristic which is similar to that of the actuation opening map.

Figure 7:
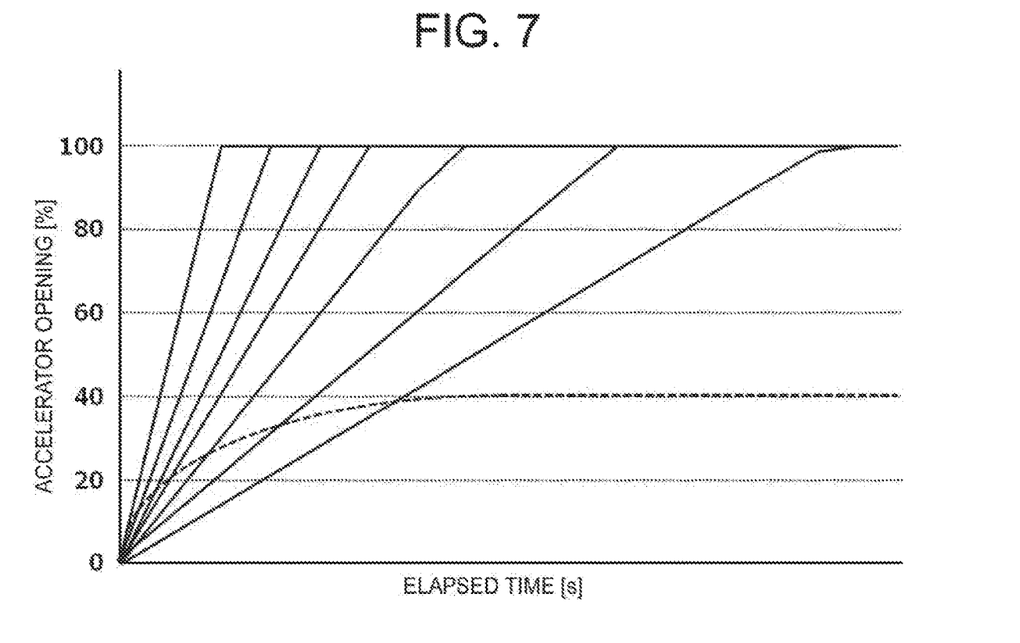
FIG. 7 is an explanatory diagram of a state where an optimum correction coefficient is obtained in a plurality of acceleration states.

The correction coefficient map 296 is a map for defining a correction coefficient (a coefficient) used for correcting the actuation timing at the steady-state operation time, at a transient operation time such as at an acceleration time and so forth and the correction coefficient according to a change amount of the accelerator opening is set as illustrated in FIG. 5. The correction coefficient has a value which is larger than 0.0 and is equal to or less than 1.0 so as to advance the actuation timing as needed in order to suppress an actuation delay of the electric supercharger 140 at the transient operation time and is decreased little by little (gradually decreased) as the change amount of the accelerator opening is increased. Incidentally, the correction coefficient map 296 is acquired by obtaining an optimum correction coefficient through, for example, experiments and so forth for each of a plurality of acceleration states according to a change rate of the accelerator opening and plotting (see a broken line) it on the map as illustrated in FIG. 7.

Figure 8:
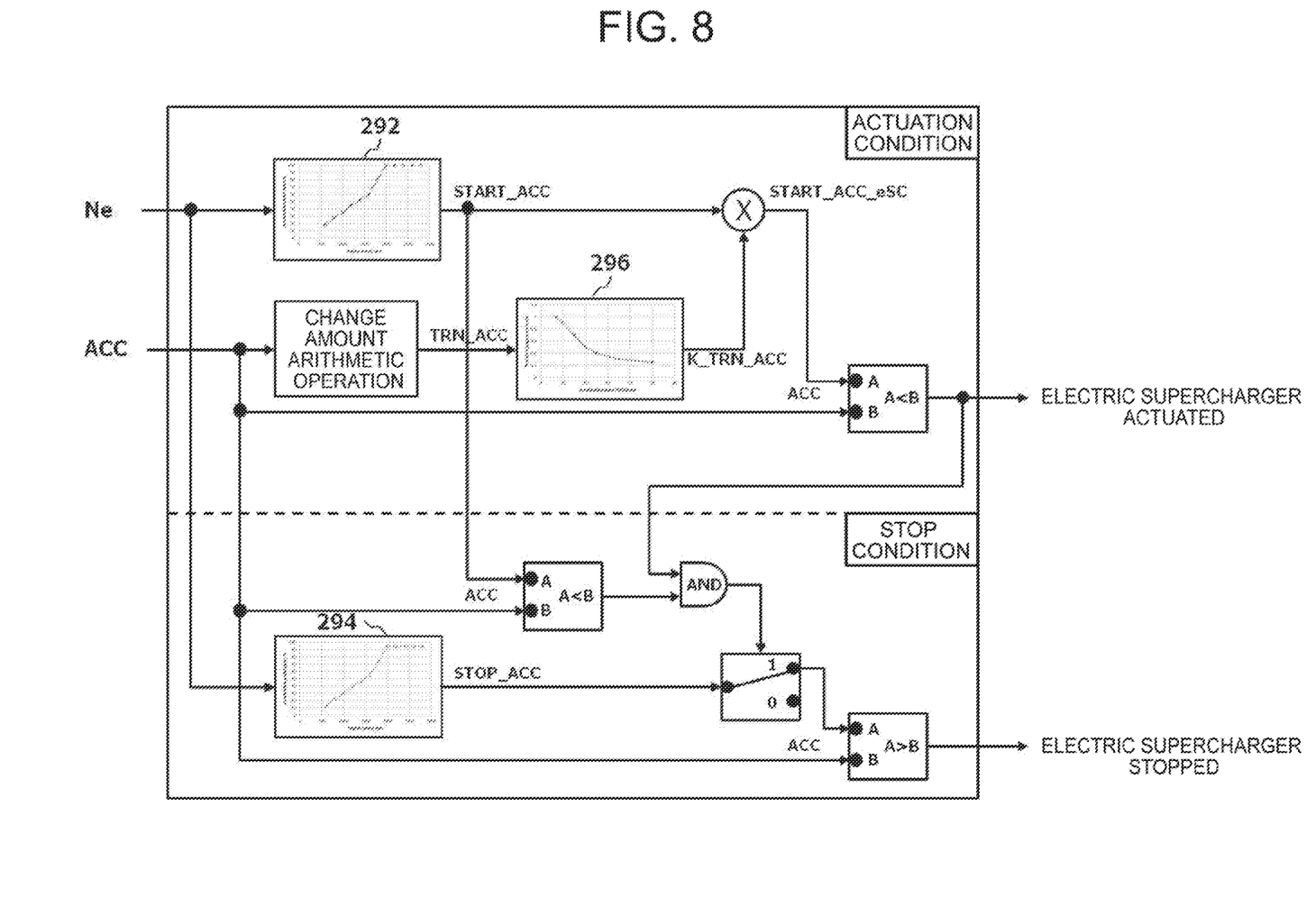
FIG. 8 is a functional block diagram illustrating one example of a function of controlling an electric supercharger.

The electronic control unit 290 obtains an actuation opening START_ACC at the steady-state operation time according to the rotational speed Ne with reference to the actuation opening map 292 as illustrated in FIG. 8. The electronic control unit 290 monitors the accelerator opening ACC and obtains, for example, an accelerator opening change amount TRN_ACC per unit time. In addition, the electronic control unit 290 obtains a correction coefficient K_TRN_ACC according to the accelerator opening change amount TRN_ACC with reference to the correction coefficient map 296. Further, the electronic control unit 290 obtains an actuation timing START_ACC_eSC of the electric supercharger 140 that a transient state is taken into consideration by multiplying the actuation opening START_ACC at the steady-state operation time and the correction coefficient K_TRN_ACC. Then, when the accelerator opening ACC becomes larger than the actuation timing START_ACC_eSC, the electronic control unit 290 actuates the electric supercharger 140. Here, when the electric supercharger 140 is to be actuated, the electronic control unit 290 outputs the control signal to the channel switching valve 190 and introduces the total amount of the intake air which has passed through the air cleaner 130 into the electric supercharger 140.

After the electric supercharger 140 has been actuated, the electronic control unit 290 obtains a stop opening STOP_ACC according to the rotational speed Ne with reference to the stop opening map 294. Then, when the accelerator opening ACC becomes larger than the actuation opening START_ACC and thereafter the accelerator opening ACC becomes less than the stop opening STOP_ACC, the electronic control unit 290 stops the electric supercharger 140. In short, when the accelerator opening ACC exceeds the actuation opening START_ACC according to the rotational speed Ne and thereafter the accelerator opening ACC becomes less than the stop opening STOP_ACC according to the rotational speed Ne, the electronic control unit 290 stops the electric supercharger 140. Here, when the electric supercharger 140 is to be stopped, the electronic control unit 290 outputs the control signal to the channel switching valve 190 and introduces the total amount of the intake air which has passed through the air cleaner 130 directly into the turbocharger 150.

Incidentally, when engine torque according to the rotational speed Ne and the accelerator opening ACC cannot be exhibited even though the electric supercharger 140 is actuated, the electronic control unit 290 is also able to assist the torque by the motor generator 220 by appropriately controlling the energy storage system 270. In addition, for example, when there is a margin in the engine torque, the electronic control unit 290 is able to store the electric power generated by the electric motor 142 and the motor generator 220 into the energy storage system 270 by appropriately controlling the channel switching valve 190 and the energy storage system 270. At this time, the electronic control unit 290 is able to control an electric power generation amount of the electric motor 142 by setting the channel switching valve 190 to the intermediate opening.

Figure 9:
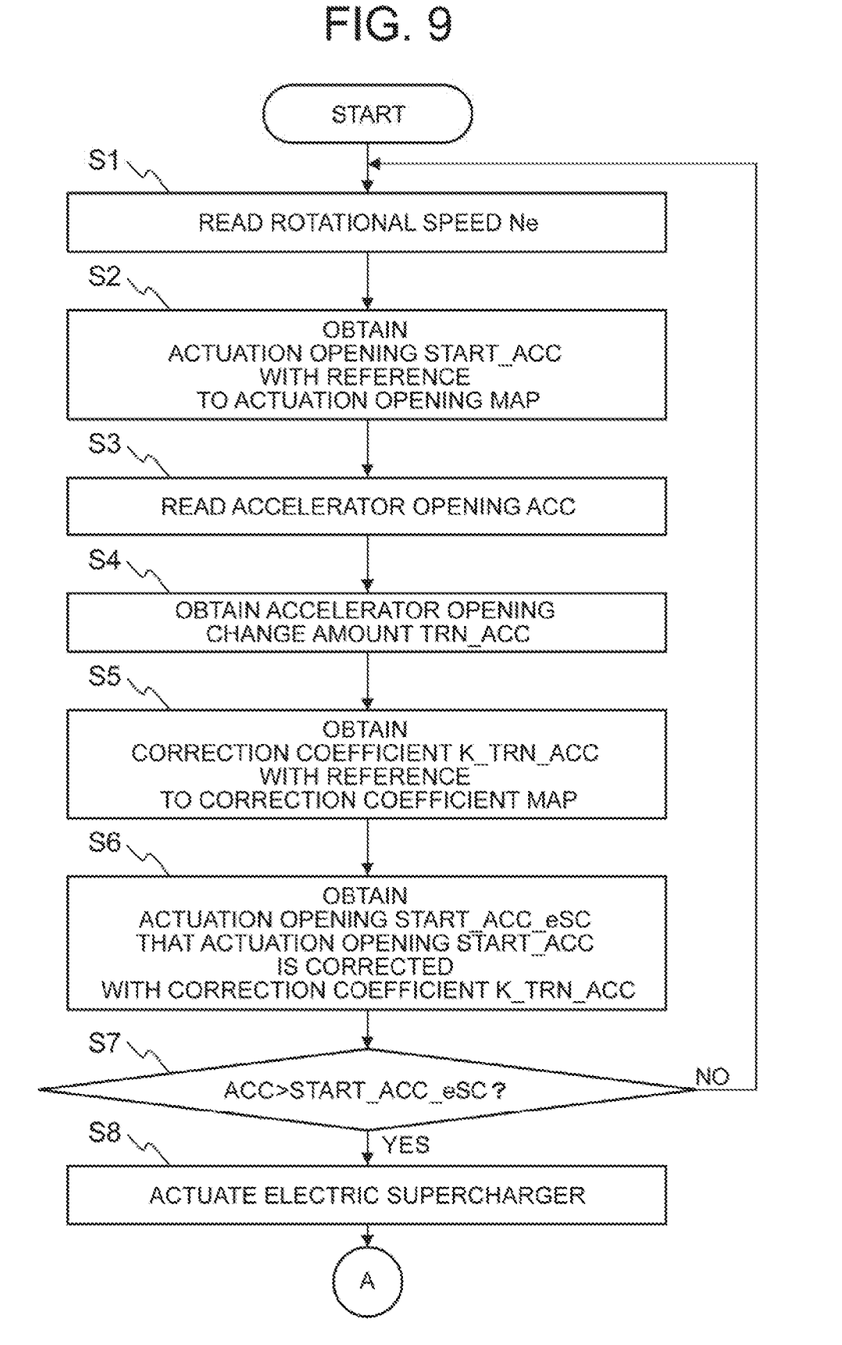
FIG. 9 is a flowchart illustrating one example of a control program for the electric supercharger.
Figure 10:
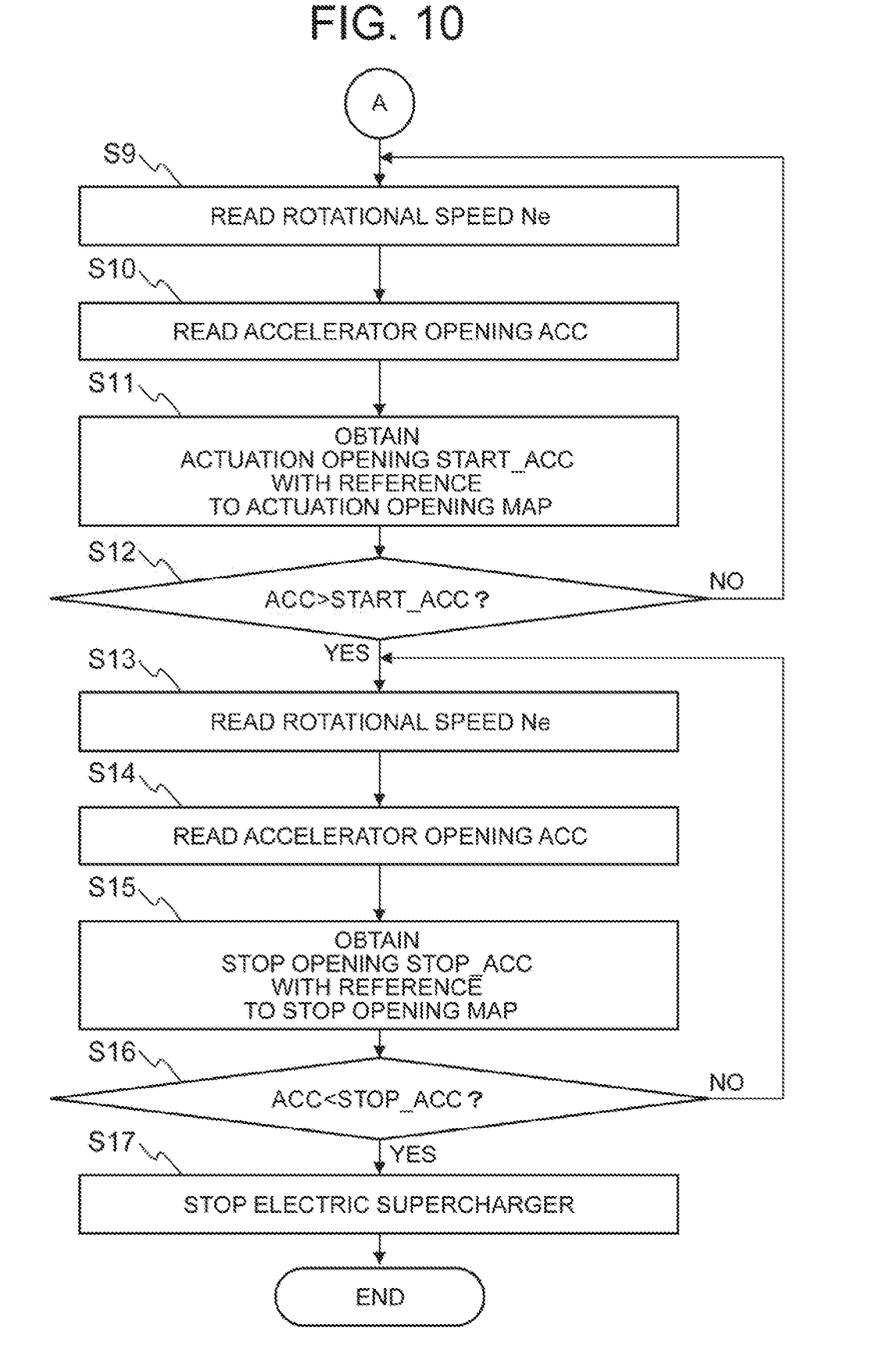
FIG. 10 is a flowchart illustrating one example of the control program for the electric supercharger.

FIG. 9 and FIG. 10 illustrate a control program for the electric supercharger 140 that the processor A of the electronic control unit 290 repetitively executes with starting-up of the electronic control unit 290 as a trigger. Here, the control program for the electric supercharger 140 is stored in advance in, for example, the nonvolatile memory B of the electronic control unit 290.

In step 1 (abbreviated as "S1" in the drawing. The same applies hereafter), the processor A of the electronic control unit 290 reads the rotational speed Ne out of the rotational speed sensor 300.

In step 2, the processor A of the electronic control unit 290 obtains the actuation opening START_ACC according to the rotational speed Ne with reference to the actuation opening map 292 (FIG. 3) stored in the nonvolatile memory B.

In step 3, the processor A of the electronic control unit 290 reads the accelerator opening ACC out of the accelerator opening sensor 310.

In step 4, the processor A of the electronic control unit 290 obtains the accelerator opening change amount TRN_ACC per unit time from, for example, a change state of the accelerator opening ACC.

In step 5, the processor A of the electronic control unit 290 obtains the correction coefficient K_TRN_ACC according to the accelerator opening change amount TRN_ACC with reference to the correction coefficient map 296 (FIG. 5) stored in the nonvolatile memory B.

In step 6, the processor A of the electronic control unit 290 obtains the actuation opening START_ACC_eSC of the electric supercharger 140 that the transient state is taken into consideration by multiplying the actuation opening START_ACC and the correction coefficient K_TRN_ACC (START_ACC_eSC=START_ACC×K_TRN_ACC). In short, the processor A of the electronic control unit 290 corrects the actuation opening START_ACC according to the rotational speed Ne with the correction coefficient K_TRN_ACC according to the accelerator opening change amount TRN_ACC.

In step 7, the processor A of the electronic control unit 290 determines whether the accelerator opening ACC is larger than the actuation opening START_ACC_eSC. Then, when the processor A of the electronic control unit 290 determines that the accelerator opening ACC is larger than the actuation opening START_ACC_eSC (Yes), it advances the process to step 8. On the other hand, when the processor A of the electronic control unit 290 determines that the accelerator opening ACC is equal to or less than the actuation opening START_ACC_eSC (No), it returns the process to step 1.

In step 8, the processor A of the electronic control unit 290 actuates the electric supercharger 140. Specifically, the processor A of the electronic control unit 290 outputs an actuation signal to the channel switching valve 190 and introduces the total amount of the intake air which has passed through the air cleaner 130 into the electric supercharger 140. In addition, the processor A of the electronic control unit 290 outputs the actuation signal to the energy storage system 270 so as to actuate the electric motor 142 of the electric supercharger 140. When the electric motor 142 is actuated, the compressor 144 rotationally drives and supercharging of the intake air is started.

In step 9, the processor A of the electronic control unit 290 reads the rotational speed Ne out of the rotational speed sensor 300.

In step 10, the processor A of the electronic control unit 290 reads the accelerator opening ACC out of the accelerator opening sensor 310.

In step 11, the processor A of the electronic control unit 290 obtains the actuation opening START_ACC according to the rotational speed Ne with reference to the actuation opening map 292 (FIG. 3) stored in the nonvolatile memory B. Here, the actuation opening START_ACC is given as one example of a first predetermined value which defines the actuation timing according to the rotational speed of the engine.

In step 12, the processor A of the electronic control unit 290 determines whether the accelerator opening ACC is larger than the actuation opening START_ACC. Then, when the processor A of the electronic control unit 290 determines that the accelerator opening ACC is larger than the actuation opening START_ACC (Yes), it advances the process to step 13. On the other hand, when the processor A of the electronic control unit 290 determines that the accelerator opening ACC is equal to or less than the actuation opening START_ACC (No), it returns the process to step 9.

In step 13, the processor A of the electronic control unit 290 reads the rotational speed Ne out of the rotational speed sensor 300.

In step 14, the processor A of the electronic control unit 290 reads the accelerator opening ACC out of the accelerator opening sensor 310.

In step 15, the processor A of the electronic control unit 290 obtains the stop opening STOP_ACC for stopping the electric supercharger 140 according to the rotational speed Ne with reference to the stop opening map 294 (FIG. 4) stored in the nonvolatile memory B. Here, the stop opening STOP_ACC is given as one example of a second predetermined value for defining a stop timing according to the rotational speed of the engine.

In step 16, the processor A of the electronic control unit 290 determines whether the accelerator opening ACC is less than the stop opening STOP_ACC. Then, when the processor A of the electronic control unit 290 determines that the accelerator opening ACC is less than the stop opening STOP_ACC (Yes), it advances the process to step 17. On the other hand, when the processor A of the electronic control unit 290 determines that the accelerator opening ACC is equal to or larger than the stop opening STOP_ACC (No), it returns the process to step 13.

In step 17, the processor A of the electronic control unit 290 stops the electric supercharger 140. Specifically, the processor A of the electronic control unit 290 outputs the actuation signal to the channel switching valve 190 and introduces the total amount of the intake air which has passed through the air cleaner 130 into the turbocharger 150. In addition, the processor A of the electronic control unit 290 outputs the actuation signal to the energy storage system 270 so as to stop the electric motor 142 of the electric supercharger 140. At this time, the processor A of the electronic control unit 290 is able to store the electric power that the electric motor 142 has generated until it is stopped into the energy storage system 270 by appropriately controlling the energy storage system 270.

According to such an electric supercharging system, when the electric supercharger 140 is not actuated, the total amount of the intake air which has passed through the air cleaner 130 is introduced into the compressor 152 of the turbocharger 150 and it is supercharged by utilizing exhaust air energy. Then, for example, when an accelerator pedal is stepped on for acceleration of the vehicle, required torque is increased with increasing the accelerator opening ACC and the turbocharger 150 becomes unable to cope with it alone and the electric supercharger 140 is actuated. When the electric supercharger 140 is actuated, the intake air which has been supercharged therein is introduced into the compressor 152 of the turbocharger 150 and therefore a response speed of the turbocharger 150 is improved and a so-called turbo lag can be reduced.

At this time, the actuation timing of the electric supercharger 140 is changed by correcting the actuation opening START_ACC at the steady-state operation time according to the engine rotational speed Ne with the correction coefficient K_TRN_ACC according to the accelerator opening change amount TRA_ACC. Therefore, the actuation timing of the electric supercharger 140 can be advanced by appropriately setting the correction coefficient K_TRN_ACC and, in particular, the actuation delay of the electric supercharger 140 at the acceleration time can be suppressed. Then, when the actuation delay of the electric supercharger 140 is suppressed, the torque is increased in conjunction with a change in accelerator opening ACC and, for example, the drivability can be improved.

Figure 11:
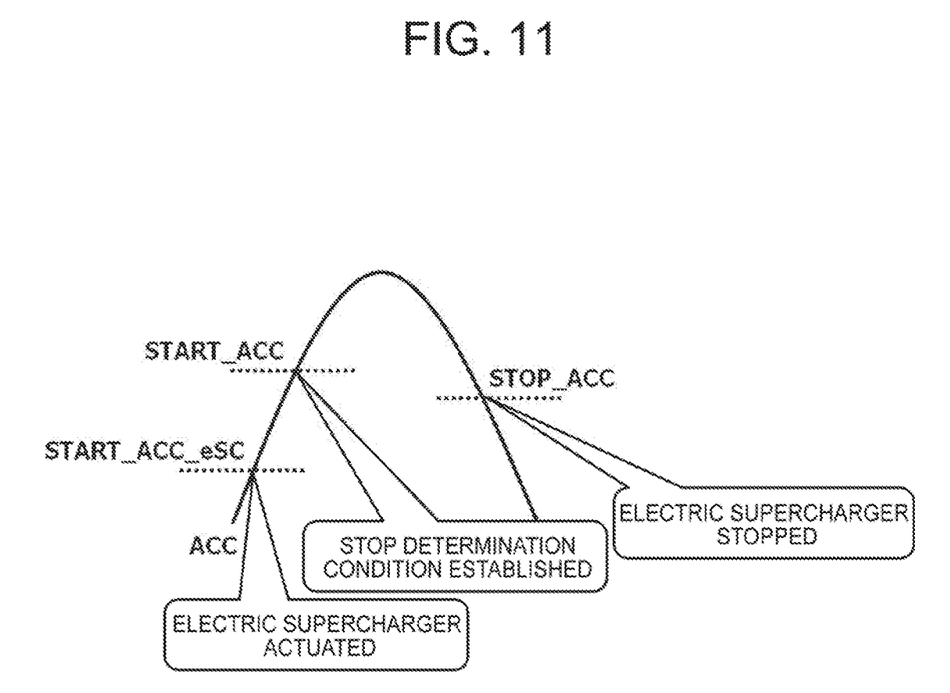
FIG. 11 is an explanatory diagram of a process of stopping the electric supercharger.

On the other hand, when the accelerator opening ACC exceeds the actuation opening START_ACC as illustrated in FIG. 11 after actuation of the electric supercharger 140, a stop determination condition for starting determination of whether a condition for stopping the electric supercharger 140 has been established is established. Then, when the accelerator opening ACC becomes less than the stop opening STOP_ACC according to the engine rotational speed Ne after establishment of the stop determination condition, the electric supercharger 140 is stopped. When the electric supercharger 140 is brought to a stop, the electric power generated in the electric motor 142 of the electric supercharger 140 and the motor generator 220 can be stored into the energy storage system 270 by appropriately controlling the channel switching valve 190 and the energy storage system 270 and thereby fuel efficiency of the diesel engine 100 can be improved.

In addition, when the accelerator opening ACC exceeds the actuation opening START_ACC after actuation of the electric supercharger 140, the stop determination condition for the electric supercharger 140 is established and therefore hunching can be suppressed even when a difference between the actuation opening START_ACC_eSC and the stop opening STOP_ACC is small. In addition, since the condition for stopping the electric supercharger 140 is able to use the stop opening STOP_ACC at the steady-state operation time, the electric supercharger 140 comes to a stop earlier than usual at a deceleration time and power consumption of the electric supercharger 140 can be suppressed.

Incidentally, as the electric supercharging system, the motor generator 220 or the turbocharger 150 is not necessarily required.

REFERENCE SYMBOL LIST 100 diesel engine (engine)
120 intake pipe (intake air passage)
140 electric supercharger
150 turbocharger
290 electronic control unit (control unit)
296 correction coefficient map (map)
300 rotational speed sensor
310 accelerator opening sensor

The invention claimed is:

1. An electric supercharging system, comprising: an electric supercharger which is disposed in an intake air passage of an engine; an actuation timing of the electric supercharger which is a timing at which the electric supercharger is actuated; a control unit which changes the actuation timing based on a rotational speed of the engine and a rate of change of an accelerator opening; and at least one or more sensors configured to provide the control unit with the rotational speed of the engine and the rate of change of the accelerator opening, wherein the control unit provides output signals to control the electric supercharger, wherein the control unit corrects the actuation timing according to the rotational speed of the engine and a coefficient, wherein the coefficient advances the actuation timing based on the rate of change of the accelerator opening.

2. The electric supercharging system according to claim 1, wherein the coefficient is defined according to a map, wherein the coefficient is gradually decreased as the rate of change of the accelerator opening is increased.

3. The electric supercharging system according to claim 1, wherein the control unit actuates the electric supercharger, when the accelerator opening exceeds a first predetermined value which defines the actuation timing according to the rotational speed of the engine, and wherein the control unit stops the electric supercharger, when the accelerator opening becomes less than a second predetermined value which defines a stop timing at which the electric supercharger is stopped according to the rotational speed of the engine.

4. The electric supercharging system according to claim 3, wherein the first predetermined value is greater than the second predetermined value.

5. The electric supercharging system according to claim 1, wherein a turbocharger is disposed in the intake air passage downstream of the electric supercharger.

6. A method for controlling electric supercharger located in an intake air passage of an engine, comprising: changing a timing at which the electric supercharger is actuated with a control unit based on a rotational speed of the engine and a rate of change of the accelerator opening;
   providing an output signal to control the electric supercharger with the control unit; and
   correcting the timing at which the electric supercharger according to the rotational speed of the engine with a coefficient, wherein the coefficient is based on the rate of change of the accelerator opening, wherein the coefficient advances the actuation timing based on the rate of change of the accelerator opening.

7. The method for controlling electric supercharger according to claim 6, further comprising the control unit obtaining the coefficient according to the rate of change of the accelerator opening from a map where the coefficient is gradually decreased as the rate of change of the accelerator opening is increased.

8. The method for controlling electric supercharger according to claim 6, further comprising the control unit actuating the electric supercharger, when the accelerator opening exceeds a first predetermined value of the timing at which the electric supercharger is actuated defined by the rotational speed of the engine; and the control unit stopping the electric supercharger when the accelerator opening becomes less than a second predetermined value a timing at which the electric supercharger is stopped according to the rotational speed of the engine.

\* \* \* \* \*